United States Patent [19]
Salmon et al.

[11] Patent Number: 5,619,272
[45] Date of Patent: Apr. 8, 1997

[54] PROCESS FOR DEINTERLACING THE FRAMES OF A MOVING IMAGE SEQUENCE

[75] Inventors: Philippe Salmon, D'Aubigne; Bertrand Chupeau, Rennes, both of France

[73] Assignee: Thomson-CSF, Paris, France

[21] Appl. No.: 464,822

[22] PCT Filed: Dec. 14, 1993

[86] PCT No.: PCT/FR93/01243

§ 371 Date: Jun. 30, 1995

§ 102(e) Date: Jun. 30, 1995

[87] PCT Pub. No.: WO94/16522

PCT Pub. Date: Jul. 21, 1994

[30] Foreign Application Priority Data

Dec. 30, 1992 [FR] France ................................ 92 15918

[51] Int. Cl.$^6$ ............................................ H04N 7/01
[52] U.S. Cl. ............................................ 348/452; 348/700

[58] Field of Search ............................ 348/441, 448, 348/451, 452, 458, 699, 700, 701; H04N 7/01

[56] References Cited

U.S. PATENT DOCUMENTS

| 4,984,077 | 1/1991 | Uchida | 348/700 |
| 5,027,205 | 6/1991 | Avis | 348/700 |
| 5,410,356 | 4/1995 | Kikuchi et al. | 348/452 |

*Primary Examiner*—Victor R. Kostak
*Attorney, Agent, or Firm*—Oblon, Spivak, McClelland, Maier & Neustadt, P.C.

[57] ABSTRACT

In this process the frames are composed of frames with parity of a first type (1, 2) interlaced with frames with parity of a second type. It consists in interpolating the missing lines in the direction of the motion (3) on the one hand, by vertical intra-frame linear filtering (6) on the other hand, and in switching between these two values (8) depending on the confidence accorded to the motion vector.

19 Claims, 9 Drawing Sheets

□ point corresponding to a complete pixel in the frame = point to be estimate

⁝⁚⁝ point corresponding to 1/2 of a pixel in the frame

⁚⁚ point corresponding to 1/4 of a pixel in the frame = point of projection of the motion

PROCESS FOR DEINTERLACING THE FRAMES OF A MOVING IMAGE SEQUENCE

BACKGROUND OF THE INVENTION

1. Field of the Invention

The present invention relates to a process for deinterlacing the frees of a moving image sequence.

It applies in particular to the conversion of television image formats.

2. Discussion of Background

The format usually used in television is termed "interlaced" scanning, that is to say that alternately a "frame" consisting only of even-numbered lines or of odd-numbered lines of the image is transmitted instead of the complete image. This halving in the quantity of information to be transmitted takes place however to the detriment of the quality of the images, and this is all the more noticeable when moving images are involved. The invention entails a process for converting the "interlaced" scanning format into the so-called "progressive" or "sequential" natural format in which all of the lines are present with each image. The intended objective is to reconstruct, from a sequence of interlaced source images, a sequence of progressive images with a visual quality which is as close as possible to what may be an ideal sequence of progressive source images, which was never interlaced.

The existing techniques of reconstruction may be classified into four categories depending on whether they employ linear, motion-adapted, non-linear motion non-compensated or motion-compensated filterings. Amongst the techniques of linear filtering, inter-frame pure temporal filtering is ideal for sequences with very weak motion, but highly visible artefacts quickly occur once the scene moves, essentially on the contours of the objects in motion which tend to become double (object ghosts). Intra-frame (or vertical) pure linear filtering never produces such troublesome artefacts and is therefore chosen in preference for sequences with substantial motion but, however, the resolution of the image thus deinterlaced remains limited in principle and certain spectral aliasing effects (staircase phenomenon on the diagonal contours) cannot be suppressed. Therefore, a spatio-temporal linear compromise can only accumulate the defects in the two types of filtering. Motion-adapted filtering consists in toggling between various modes of linear filtering within the same image depending on the motion, opting for pure temporal filtering for weak motions, pure spatial filtering for strong motions and spatio-temporal filtering for intermediate motions. Independently of the problems of visibility of switching between the various modes, the intrinsic problems of linear filtering in respect of sequences in motion are not resolved.

Numerous non-linear filtering techniques have been proposed, among them the best known are founded on the principle of median filtering, to improve the deinterlacing without estimating the motion in the scene represented. However, the results obtained are still fairly mediocre. It is commonly accepted that only motion-compensated techniques, that is to say which fetch missing information from the adjacent images, which precede and follow in the direction of motion of the objects of the scene, allow conversions of spatio-temporal formats without degradation. It appears in fact that only an accurate knowledge of the motion can make it possible to adapt the conversions to the spatio-temporal spectrum of the moving images. Several approaches along these lines, founded on motion compensation, are known, essentially in the publications produced in the context of the European RACE II "Transit" project. However, the major problem which has not yet been resolved is that of the control of a fallback mode, made necessary by the inevitable errors in estimating the inter-image motion.

The aim of the invention is to alleviate the aforesaid drawbacks.

SUMMARY OF THE INVENTION

For this purpose, the subject of the invention is a process for deinterlacing the frames of a sequence of moving images composed of frames with parity of a first type interlaced with frames with parity of a second type, characterized in that it consists in estimating the motion between frames of like parity, by tagging the pixels as "normal", "occluding" or "uncovered" and in projecting the motion of the pixels tagged as "normal" or "occluding" in their direction to obtain the mid-distance motion, in assigning for each point to be constructed of the missing lines a vector twinned with a validity indicator, in interpolating the pixels of the missing lines in the direction of the projected motion and by vertical intra-frame linear filtering, and in switching between these two values with the aid of the validity indicator and of the "uncovered" tags.

The main advantage of the invention is that it can be applied effectively to any digital television device which includes conversion of formats from interlaced scanning to progressive scanning.

In conventional television the interlaced format follows recommendation 601 of the CCIR ("4:2:2" standard, 625 lines at 50 Hz or 525 lines at 60 Hz, aspect ratio 4/3). The European approach to HDTV has fixed a number of initials for other formats:

EDI (Enhanced Definition Interlaced): 625 lines, interlaced, 16/9

EDP (Enhanced Definition Progressive): 625 lines, progressive, 16/9

HDI (High Definition Interlaced): 1250 lines, interlaced, 16/9

HDP (High Definition Progressive): 1250 lines, progressive, 16/9

The EDI to EDP and HDI to HDP conversions are straightforward deinterlacings and can be direct applications of the process according to the invention. However, other conversion devices can also employ the deinterlacing process according to the invention within a more complex processing chain. It may be that, for example, of the 4:2:2 conversion to EDP which employs deinterlacing and a 4/3 to 16/9 image aspect ratio conversion; of the 50 Hz HDI to 100 Hz HDI temporal "up conversion" which may be performed by cascading a high-quality deinterlacing and generating two interlaced frames from an intermediate HDP image, the image quality thus obtained thus being greatly superior to the classical repetition of frames termed AABB and finally of the generation of image slowing obtained by repeating well-deinterlaced images, followed by reinterlacing the sequence thus slowed, this giving much better visual quality than the classical repetition of interlaced frames.

These conversions of television image formats all have the aim of improving the quality of the image offered to the viewer. The corresponding devices can be envisaged in a professional environment (television studio) where a very high image quality is demanded. They may also be envisaged in a "consumer" environment (receiver) where the limiting factor is the incorporation at low cost of complex devices for estimating motion.

The devices for high quality conversion of the video image to a film support which require high-performance deinterlacing may likewise implement the process according to the invention. Such a conversion is in fact made up of the following steps: HDI/HDP conversion, noise reduction, 50 Hz to 25 Hz temporal conversion (the film speed is 24 images/s) printing on film.

The process according to the invention can also find an application in devices for converting images from interlaced digital video formats to the formats for display on the screens of computer workstations (all of which have progressive scanning) as well as to the majority of processes for handling moving image sequences which handle a progressive sequence in a way which is of much higher performance and simpler than an interlaced sequence. However, top-end high-quality deinterlacing followed by processing within the progressive context is then desirable. This may be the case for example in image compression by the techniques of sub-band coding or that of any image frequency conversion (such as the 50 Hz/60 Hz standards conversion).

BRIEF DESCRIPTION OF THE DRAWINGS

Other characteristics and advantages of the invention will emerge with the aid of the description which follows given in connection with the appended figures which represent.

DETAILED DESCRIPTION OF THE PREFERRED EMBODIMENTS

Figure 1:
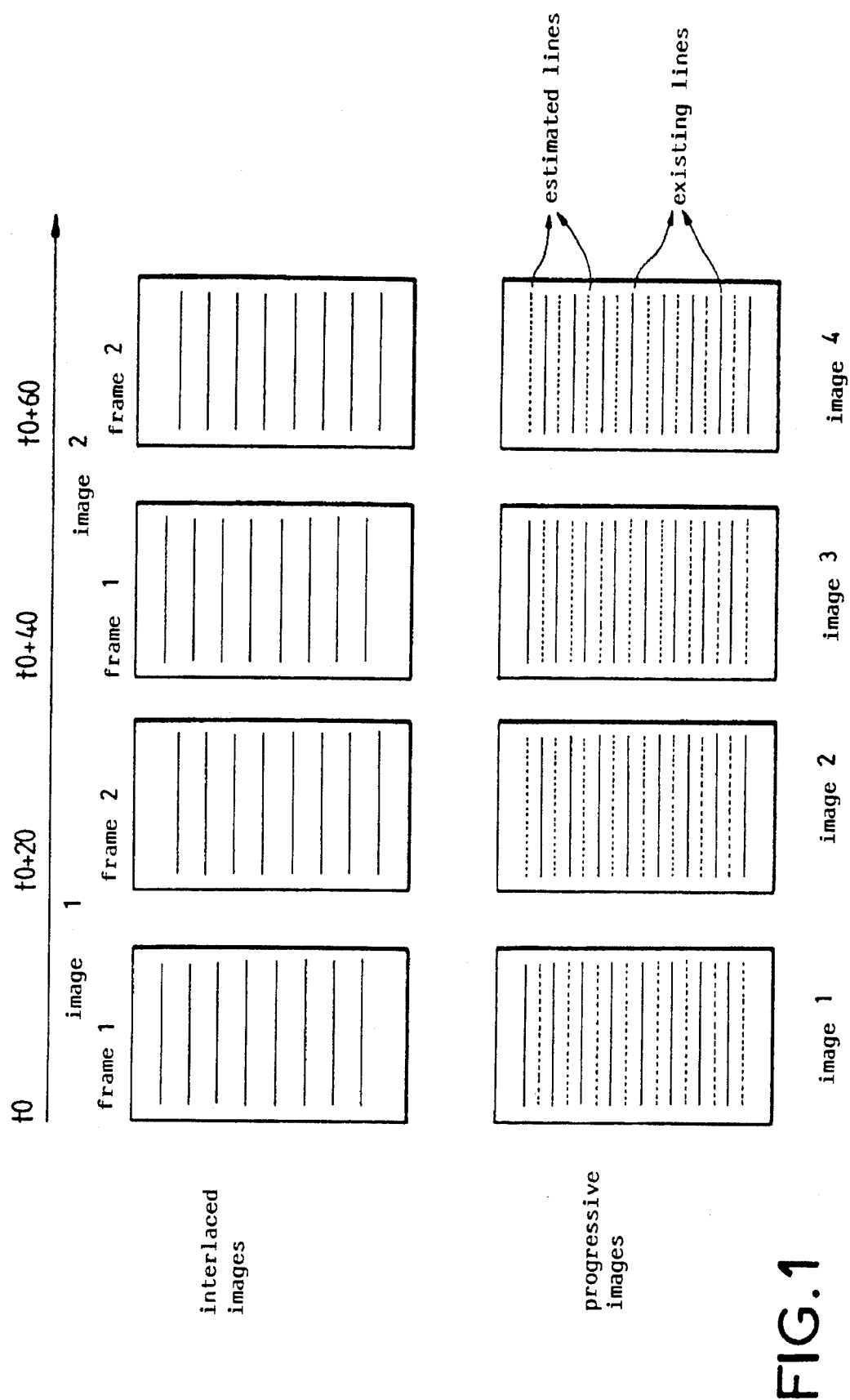
FIG. 1 an image sequence with the interlaced format opposite an image sequence with the sequential or progressive format.

In the example represented in FIG. 1 the sequence of interlaced images is depicted in the upper part of the diagram by the string of odd frames, denoted "frame 1", interlaced with even frames, denoted "frame 2". In this chaining the odd and even frames follow one another at a recurrence of 40 ms. They are depicted for the odd frames at the instants $t_o$ and $t_o+40$ and they are depicted for the even frames at the instants $t_o+20$ and $t_o+60$. The sequence of progressive images is depicted in the lower part of the diagram by a string of images denoted "image 1", "image 2" "image 3"

and "image 4", matching respectively in the diagram with the frames of the upper part. The process according to the invention makes it possible, from an image sequence in the interlaced format, which exhibits only half the total lines at each image instant, being formed alternately of even and odd lines, to interpolate the missing lines, so as to obtain the corresponding sequence at the bottom of the diagram in the sequential or progressive format of the best possible quality.

Figure 2:
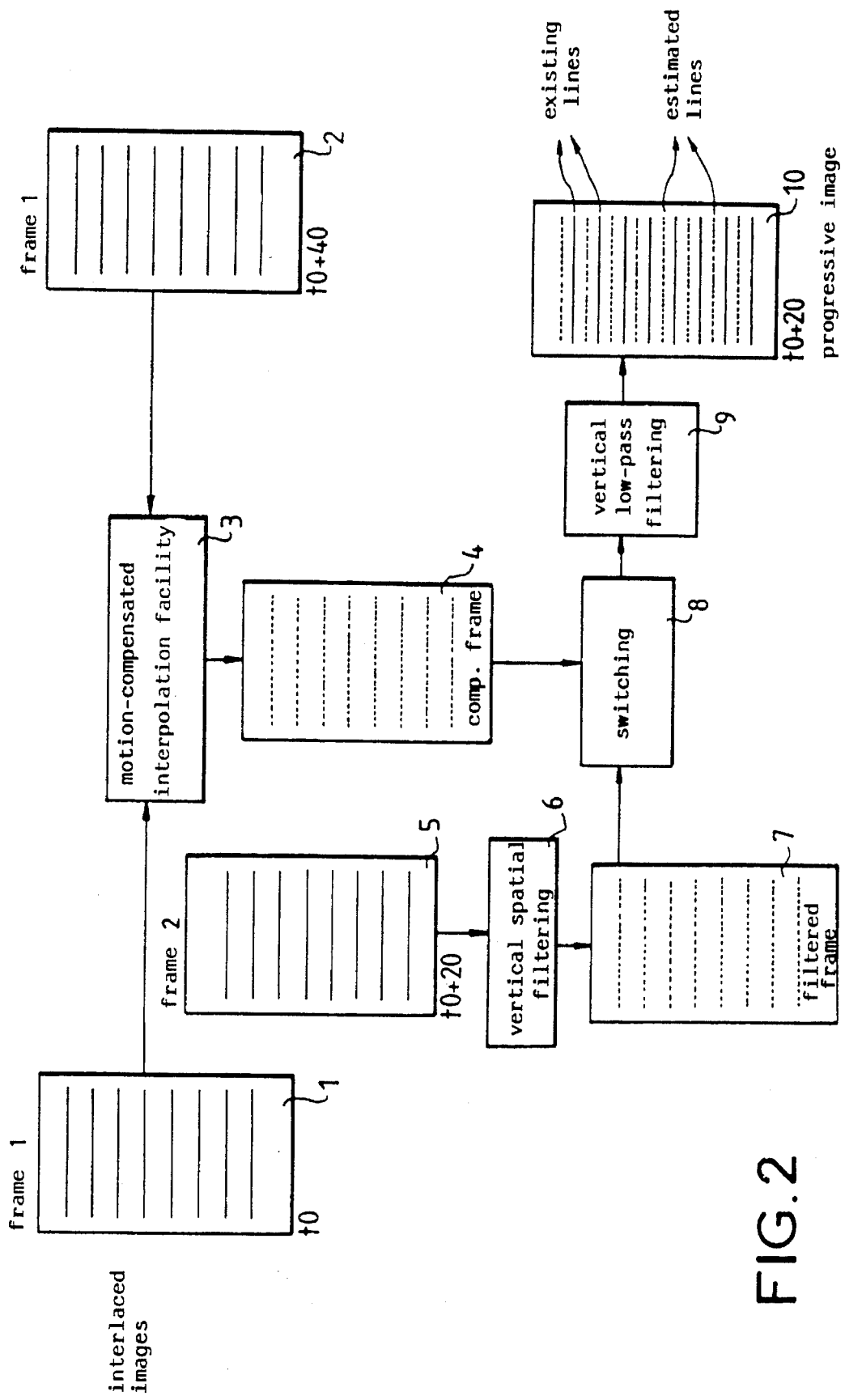
FIG. 2 the process according to the invention in the form of an overall schematic diagram.

The deinterlacing according to the invention takes place, in the manner represented in FIG. 2, according to two operating modes. The main one implements motion compensation, the other which serves as fallback mode, implements straightforward intraframe vertical linear filtering. According to the main mode, the interlaced images defined by the odd frames at the instants marked $t_o$ and $t_o+40$ ms and bearing the references 1 and 2 in FIG. 2 are applied to an interpolation facility 3 which is motion compensated. The latter delivers a motion-compensated dummy frame 4 estimated at the instant $t_o+20$ ms.

Figure 3:
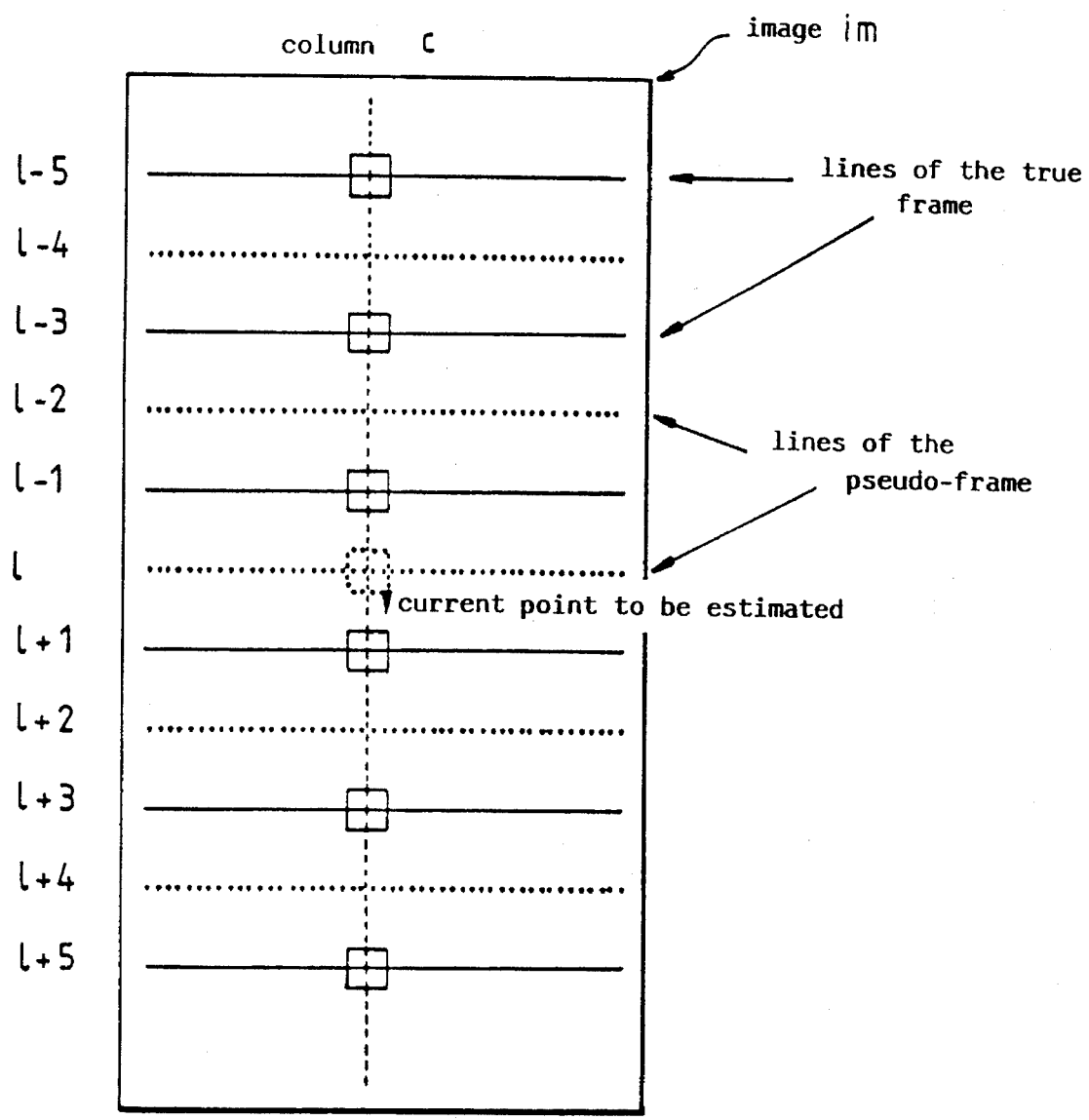
FIG. 3 the procedure for interpolation by vertical low-pass filtering implemented in the process according to the invention in order to estimate the lines of a progressive image.

In the fallback mode each even frame of an instant $t_o+20$ ms and bearing the reference 5 in FIG. 2 is filtered by a vertical spatial filter 6 embodied in the manner represented in FIG. 3 by applying weighting coefficients to each counterpart pixel of the current point over a specified number of lines above and below the current point. In FIG. 3 the current point to be estimated is spread out at the intersection of a column c and a line 1. The points considered on the lines situated on either side of the current point are placed at the intersection of the column c passing through the point the current and lines l—5, l–1, l+1, l+3 and l+5. The filtering is obtained by applying weighting coefficients (3, –25, 150, 150, –25, 3) for example to the luminance signal of each of the points considered. Estimation of the luminance signal $i_m(l, c)$ of the current point is the result of the weighted sum of the luminance signals $(i_m(l-5, c) \ldots i_m(l+5, c))$ of the points situated on either side of the current point in the same column divided by a coefficient of specified value equal to 256 for example. This filtering operation is described by the relation:

$$i_m(l, c) = (150*((i_m(l-1), c) + i_m(l+1, c)) -$$
$$25*((i_m(l-3), c) + i_m(l+3, c)) +$$
$$3*((i_m(l-5, c) + i_m(l+5, c))/256.$$

Figure 4:
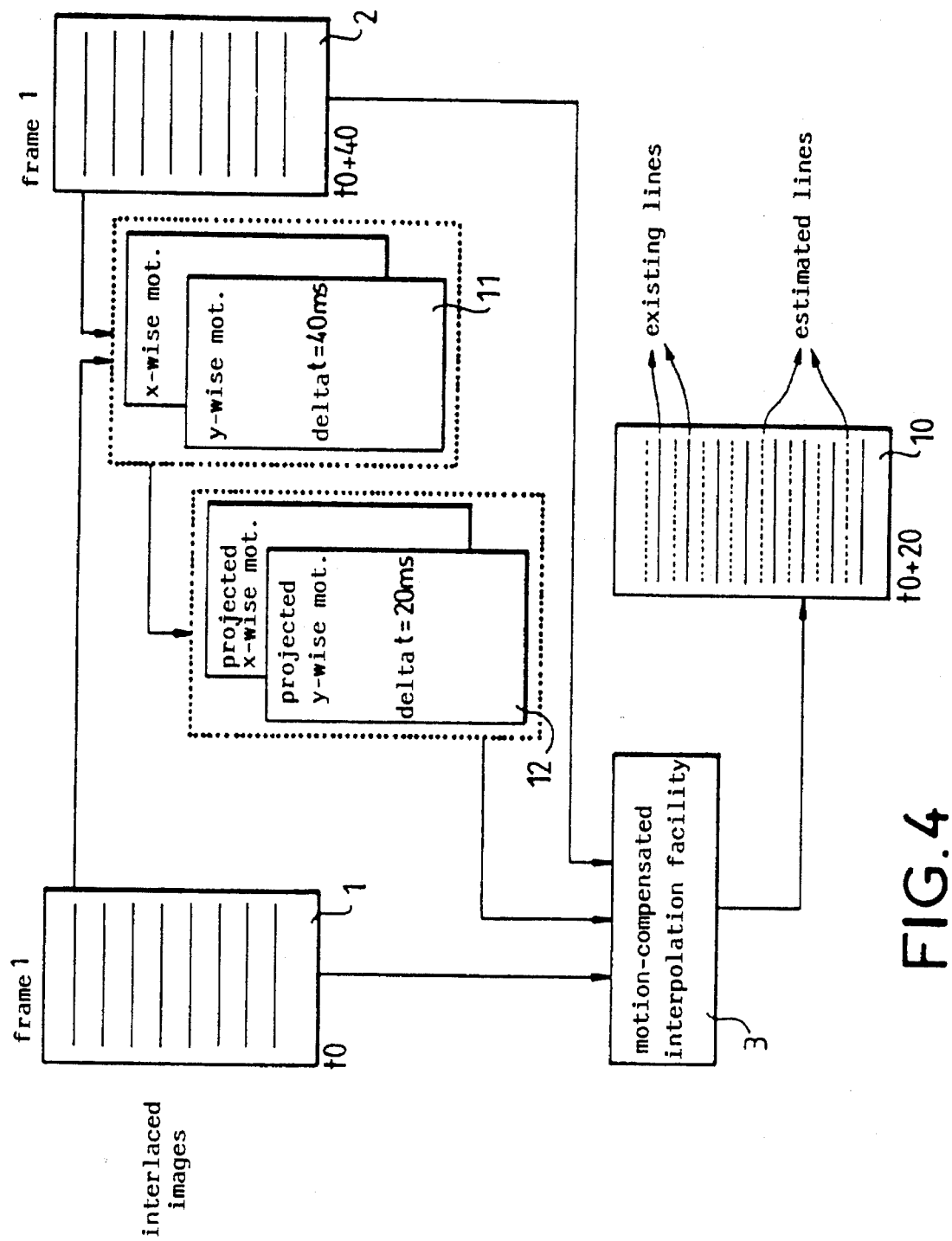
FIG. 4 the motion-compensated interpolation mode implemented in order to estimate the lines of a progressive image.
Figure 5:
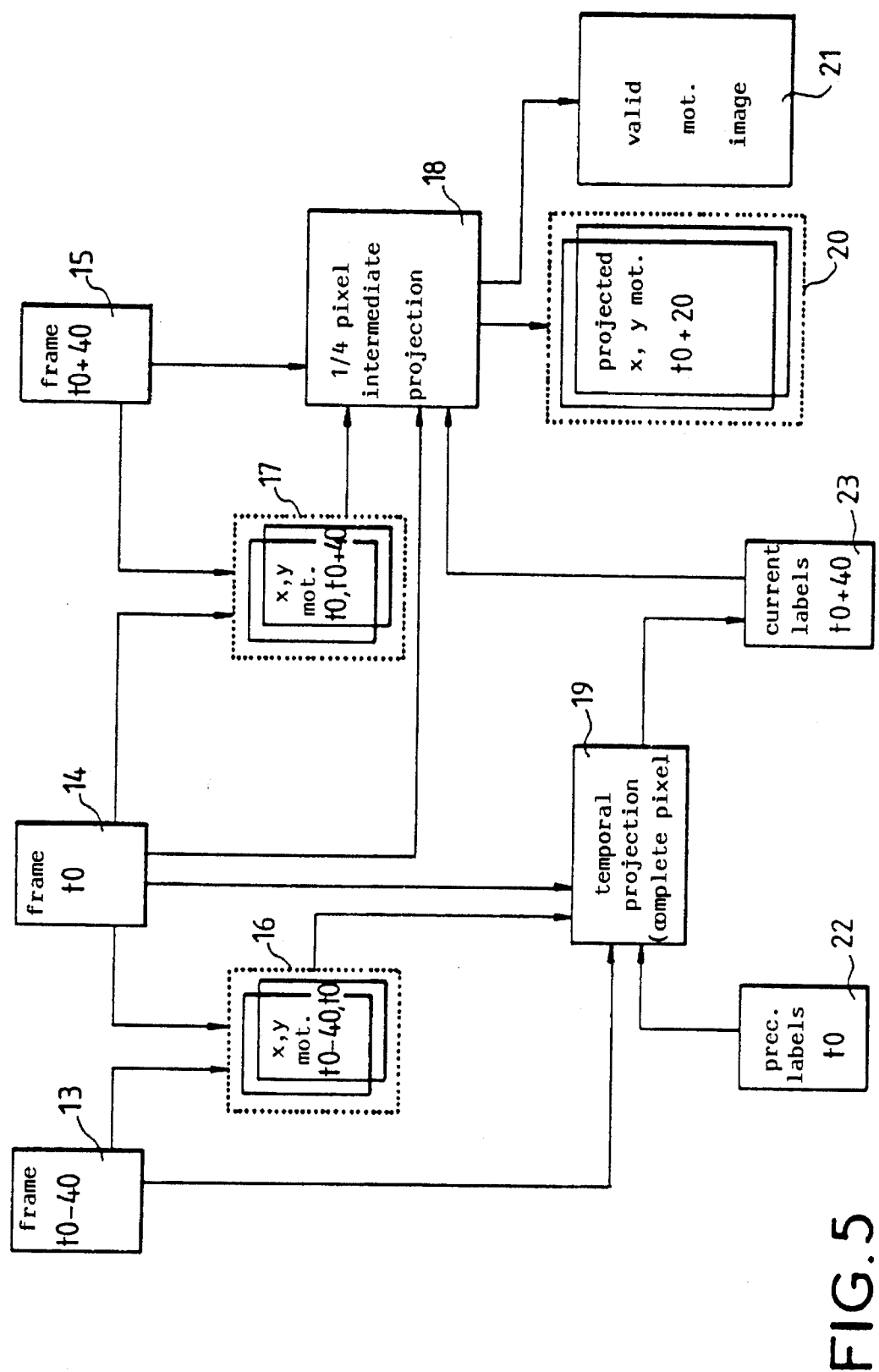
FIG. 5 a diagram illustrating a construction according to the process of the invention of a missing frame to obtain a progressive image between two consecutive frames of like parity.

In the motion-compensated mode which is represented by the diagram of FIG. 4 in which the elements which are the counterparts of those of FIG. 2 are represented with the same references, the sequences of motion vector fields, describing the X-wise and Y-wise motion between source frames of like parity (distances of 40 ms apart), are used. These vectors are defined at each pixel of the source frames and their accuracy of displacement is half a pixel. In the blocks 11 and 12 the motion vector field defined between the source frames at the instants t and t+40 ms is used to construct the missing frame in the progressive image at the instant t+20 ms. The assigning of the vectors, defined on the source frame of instant t+40 ms, to the missing frame of the image at of the instant t+20 ms is obtained by temporal projection of the field in its direction in the manner represented by the blocks 13 to 23 of FIG. 5. However, this projection can take place only under certain conditions so as to take into account the fact that it is preferable not to use the vectors corresponding to parts of the scene which are present at the instant at t+40 ms but absent at the instant t, since they have in the meantime been uncovered by foreground objects which were previously masking them. The vectors estimated by matching the image points of instants t and t+40 ms cannot in principle correctly represent the motion in these particular zones. The method of temporal projection implemented in the block 19 is the one described in the Patent Application FR 2 675 002. With the vector fields it associates tag images (or "labels" 22, 23) describing the occlusions and uncovered zones of the image. An image of the labels is constructed by temporal projection of the motion preceding the instants (t–40, t), (for the identical frame). This current labels image of is composed of three levels:

a level of "normal" vectors a level of "occluding" vectors: belonging to objects masking part of the scene between the instants t and t+40 ms and a level of "uncovered" vectors: belonging to parts of the scene uncovered between t and t+40 ms.

Figure 6:
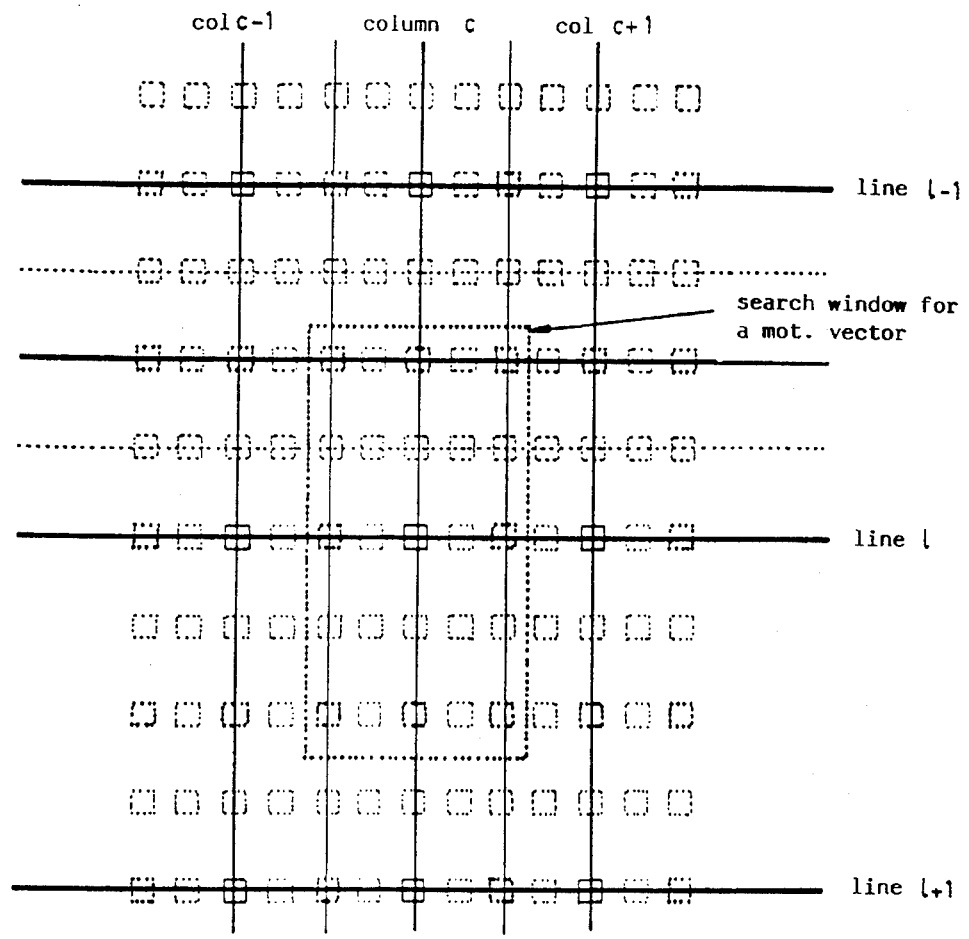
FIG. 6 a defined grid for projecting motion vectors of source images.

Projection of the motion corresponding to the instant (t+20) is carried out on the basis of the motion image obtained from the instants t and t+40 and from the image of current labels. Projection of the motion vectors along their trajectory onto the middle frame takes place by division by 2 of their X and Y components of displacement: the displacement vector with components (dX, dY) assigned to the point (X, Y) of the frame at the instant t+40 is projected at the point (X–dX/2, Y–dY/2) of the frame of instant t+20. Since the motion is estimated with an accuracy of half a pixel in the source frames, the projection obtained has an accuracy of ¼ of a pixel. It takes place in the manner represented in FIG. 6 on a defining grid 4 times larger in X and in Y than the original motion image. Since there may be several vectors culminating in the same projection and since some points may not have projected vectors, a ternary image of validity of the motion is generated in parallel with the projection. This image includes an indicator 0 to signal the absence of any projected vector, an indicator 1 to signal the presence of a reliable projected vector at the point to be interpolated, and an indicator to signal the presence of an unreliable vector. This image has the same size as one of the images of the projected motion and it is initialized to 0 (absence of projection at this point). The indicator is set to 1 when projecting a first vector (valid motion at this point). Management of conflicts is to be implemented for the possible projection of other vectors at this same point. During projection, a single projected vector per pixel is permitted. In the event of conflict, 2 cases may arise according as the vectors are similar or different.

If the vectors are similar vectors, then the vector which minimizes the initial displaced inter-image difference DFD is retained. The indicator then remains in the state 1 at this point. If the vectors are totally different, the validity indicator is set to the state 2 at this point. The test of similitude is computed through the relation

*deviation=sqrt(ex\*ex+ey\*ey)* with ex=vx1–vx2 and ey=vy1–vy2, vx1, vx2, vy1, vy2 representing the various candidate motion vectors if "deviation" is larger than a specified threshold value, equal to 3, for example, the vectors are declared different and the motion is declared invalid.

Figure 7:
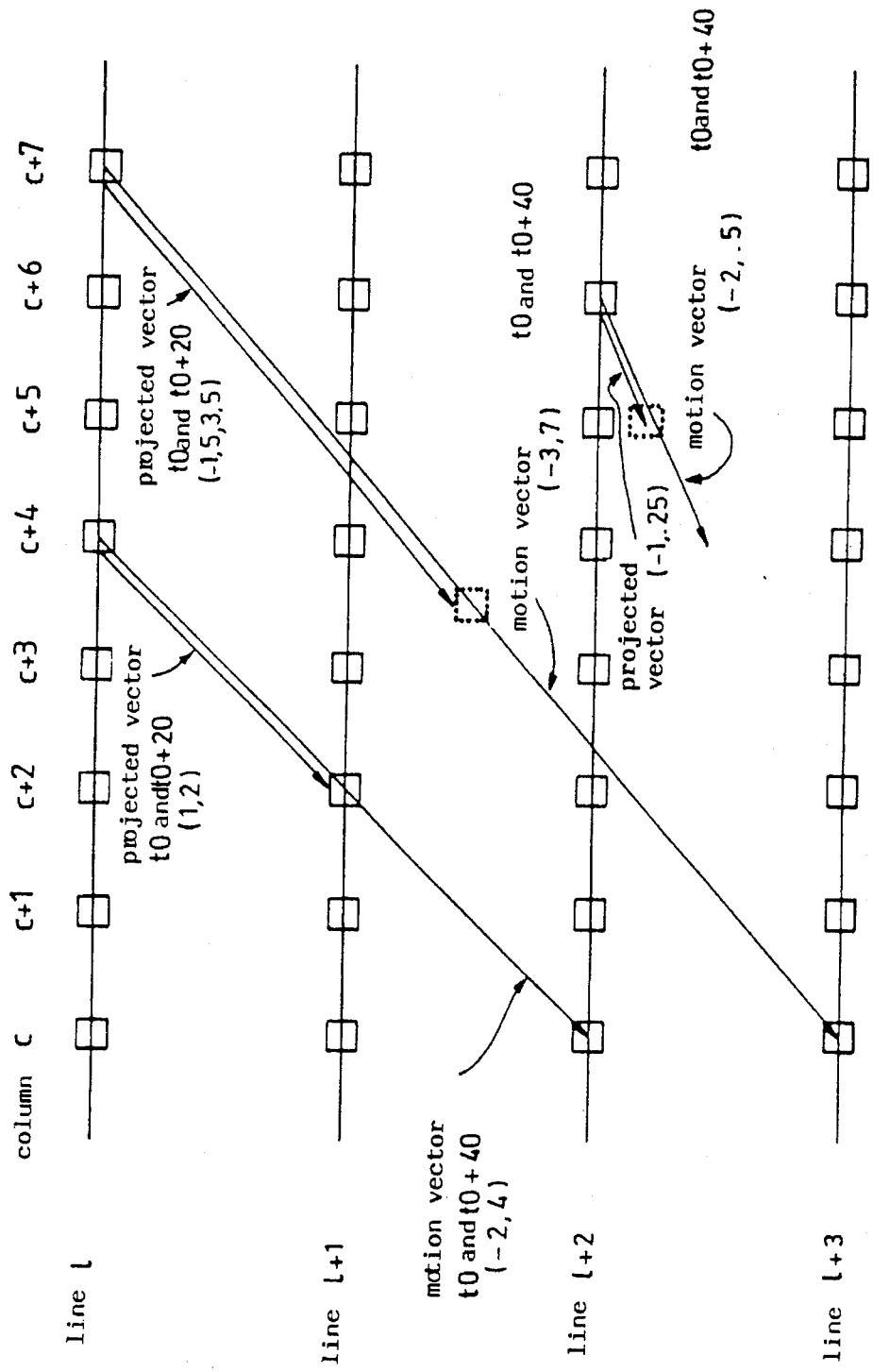
FIG. 7 examples of motion vectors and of their projected equivalents.

At the end of projection, scanning of the image of the projected vectors is performed in order to force the validity indicator into the state 2 in the case where there are non-similar vectors in a block of specified dimensions 3*3 for example, centred on the point to be tested. The test of similitude is the same as above, but this time a greater threshold value, equal to 4 for example, is used for the threshold parameter. This makes it possible to obtain at the end of projection, on a grid 4 times larger in X and in Y, 0 or 1 projected vector and a validity indicator set to 0, 1 or 2. FIG. 7 presents examples of motion vectors and their projected equivalents in the grid containing 8 columns and 4 rows.

Figure 8:
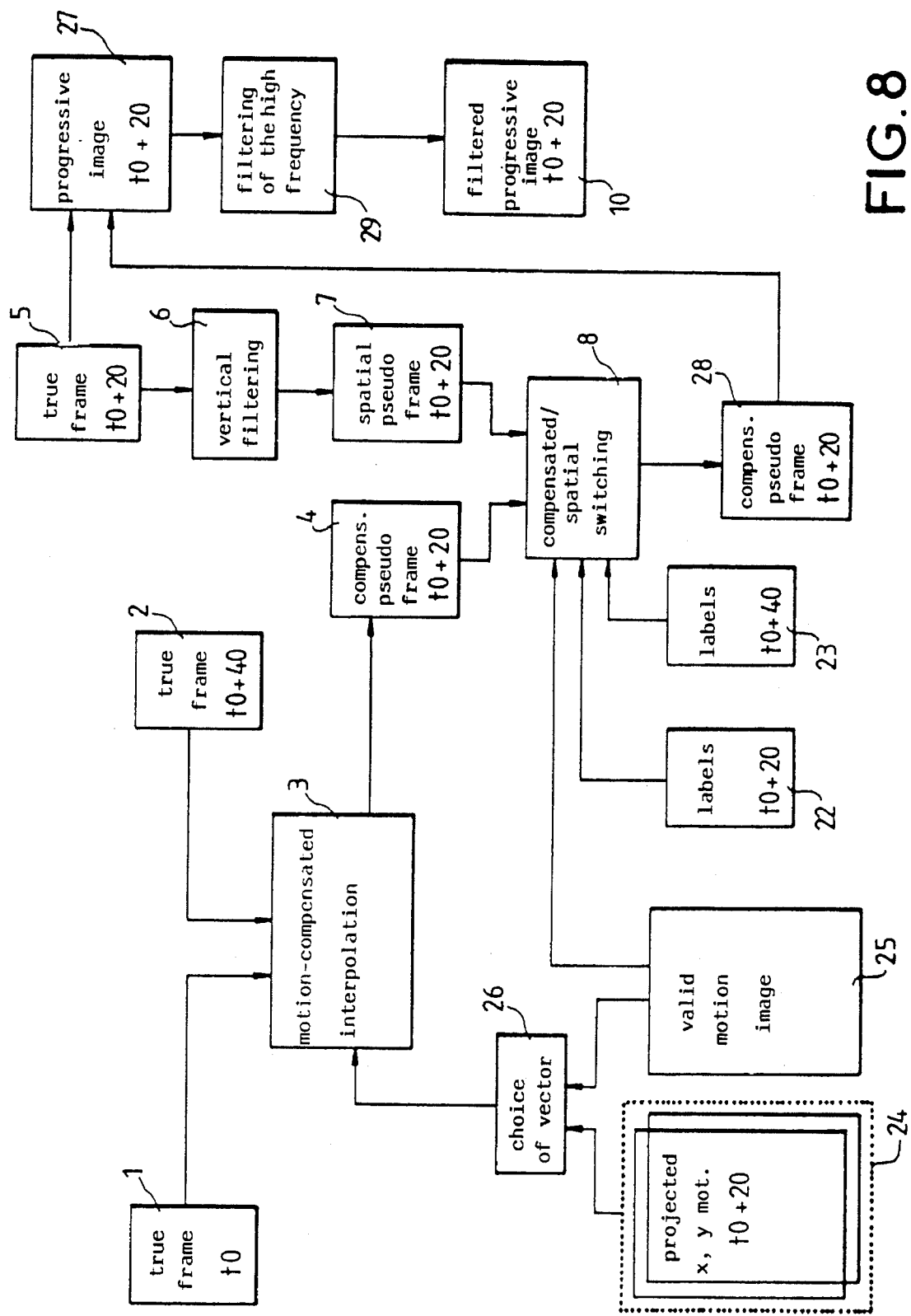
FIG. 8 an example of the construction of a deinterlaced image.

Reconstruction of the missing frame at the instant t+20 is performed on the basis of the frames of instants t and t+40 and of the field of motion between the instants t and t+40 projected to obtain the motion field in the frame of instant t+20 in the manner represented in FIG. 8 where the elements which are the counterparts of those in FIG. 2 are represented with the same references. The motion field projected at the instant $t_o$+20 is stored in the block 24 of FIG. 8. For each displacement vector with horizontal component DX and vertical component DY of a vector projected at a point (X, Y) with the frame of instant $t_o$+20 to be created, the corresponding interpolated value of luminance and of chrominance is obtained by computing the mean of the values found at the points with coordinates $$\left(X+\frac{DX}{2}, Y+\frac{DY}{2}\right)$$

in the source frame of instant $t_o$+40 and at the point with coordinates $$\left(X-\frac{DX}{2}, Y-\frac{DY}{2}\right)$$

in the source frame at the instant $t_o$.

For each point to be estimated it is necessary to look inside a window of ±2 pixels in X and in Y for example, centred about the point, if there are one or more projected vectors. Four possibilities may arise. If there is no projected vector in the vicinity, the interpolated point is calculated together with a zero vector and the validity indicator is put into the state 0.

If there is only one vector in the vicinity investigated and there is no invalid motion in the vicinity of the point, a reconstructed point is calculated with the aid of this vector and the validity indicator is put into the state 1 for this point.

If there are several vectors available and there is no point with invalid motion in the vicinity, selection takes place through a test of their displaced inter-image difference DFD and the validity indicator is held in the state 1 at this point.

If there are one or more invalid motion vectors in the vicinity, the validity indicator is forced to take the state 2 at this point.

in FIG. 8 the validity indicators are stored in the block 25 and the choice of vectors is performed by the block 26, which transmits the vectors to the interpolation block 3. This arrangement makes it possible to provide for a frame interpolated in the direction of motion, twinned with a ternary image of indicator of validity of the vector used. As in FIG. 2, vertical filtering 6 performed on a true frame at an instant $t_o$+20 and an interpolation block 3 make it possible to provide for two interpolated pseudo frames represented by the blocks 7 and 4 respectively. The choice between these two pseudo frames is performed for each pixel by the switching block 8. Overall, the motion-compensated interpolated pseudo frame is of better quality over the major part of the frame than the pseudo frame arising from the vertical filtering which is of lesser quality but which offers the advantage, however, of being homogeneous over the whole frame by not exhibiting any local disparity. The vertical filtered pseudo frame 7 represents the fallback mode necessary for the deficiencies of the compensated pseudo frame.

Experience shows that the spatial mode is preferable to the compensated mode in the contentious zones where the motion vectors found prove to be false. The defect introduced in this case appears to be much more visible than when using the fallback mode since in general it gives striped zones linked with the alternating lines of the true frame and a poor estimate in the lines of the compensated frame. Moreover, the defects due to poor compensation are all the more visible since the improvement made to the image in general highlights residual defects in a still more glaring manner.

Also, to marry up the true frame 5 of instant $t_o+20$ with a pseudo frame of the "compensated or spatial" modes the switching block 8 initializes a result pseudo frame 27 via a pseudo frame 28 arising from the compensated mode, and it toggles over into the spatial mode for the succeeding pixels when the corresponding validity indicator in block 25 is in the state 0 (no vector), or when the validity indicator of the block 25 is in the state 2 indicating that the vector is unreliable, in this case broadening the transfer to the spatial mode to the linewise and columnwise adjacent pixels, or that the current point lies in an uncovered majority zone in the labels image 23 associated with the source frame at the instant t+40 and the labels image 22 associated with the source frame of instant $t_o+20$.

This measure takes place by straightforward counting of pixels in a block of specified size, 5*5 for example, centred on the current point. The pixel is then forced into the spatial mode if in one or the other of the current and preceding label images there is a specified number of pixels, 7 for example out of the 25 possible in the example, classified into uncovered zones in the block.

Figure 9:
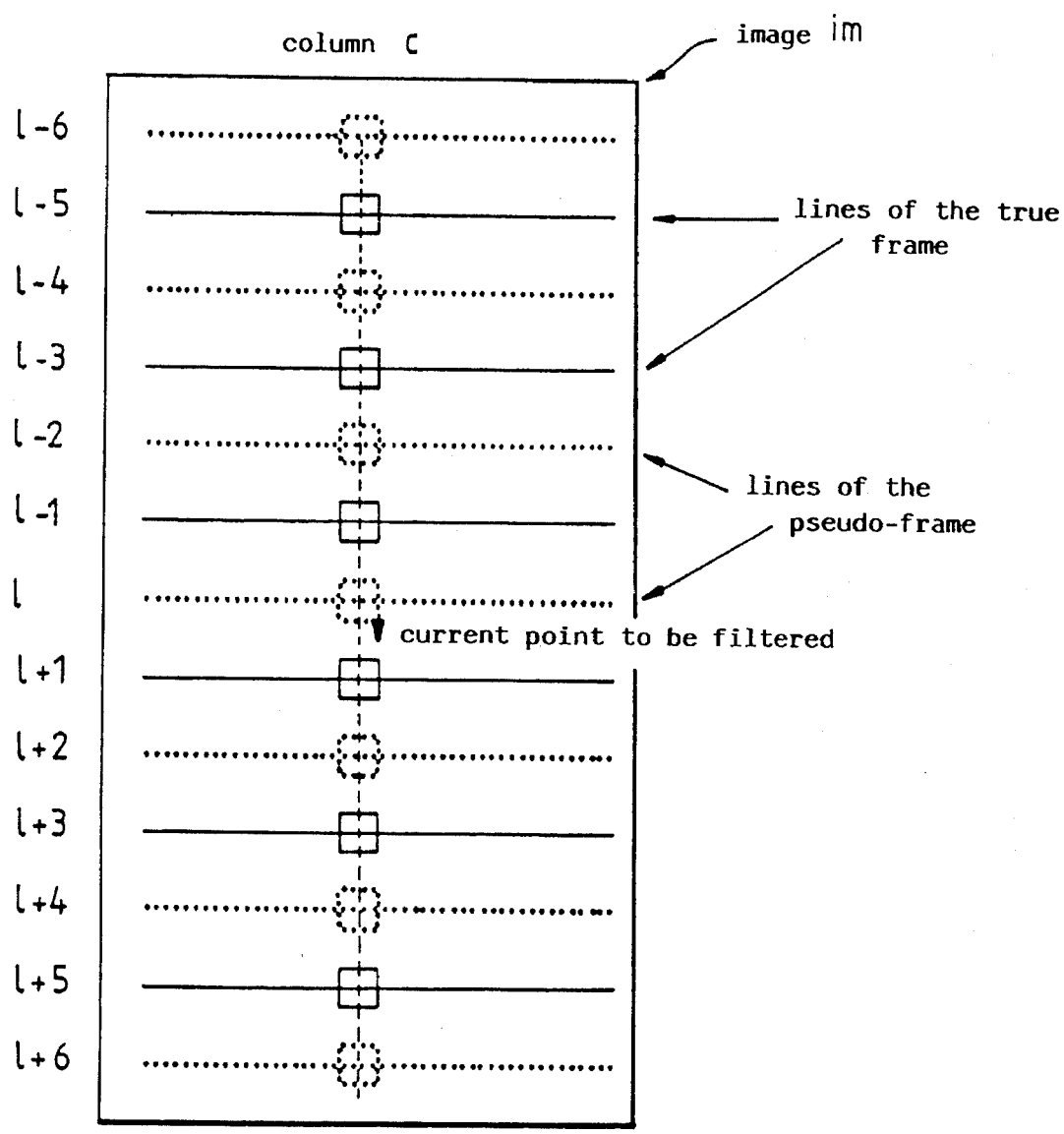
FIG. 9 an example embodiment of vertical low-pass post-filtering.

Finally, as represented in FIG. 9, high-frequency filtering 29 is performed on the lines of the progressive image 27 obtained, so as to attenuate the effects due to high frequencies. Filtering is carried out by a vertical low pass filter on the interlaced images. In FIG. 9 the coefficients using this filtering respectively have the values (−4, 8, 25, −123, 230, 728, 230, −123, 25, 8, −4)/1000

This filtering makes it possible to attenuate the comb effect which may appear in some sequences.

We claim:

1. Process for deinterlacing a sequence of moving images composed of frames with parity of a first type interlaced with frees with parity of a second type, carrying out motion estimation between the preceding frame (to) and the current frame of like parity (to+40 ms) in order to allocate a motion vector field to the preceding frame (to), carrying out a projection in their direction, onto an intermediate frame (to+20 ms) to be constructed or pseudo-frame, of the motion vectors of the preceding frame (to), characterized in that it consists:

in determining for each pixel to be created of the intermediate pseudo-frame, on the basis of the projection of the vectors onto this pseudo-frame, a validity indicator corresponding to the allocation or non-allocation of a motion vector to this pixel and, in the case of non-allocation, to the absence of a vector or to an unreliable vector calculation and in calculating this allocated motion vector at the same time;

in generating the pixels to be created of the intermediate pseudo-frame by vertical filtering of the true intermediate frame of the moving image sequence or by interpolation of the allocated motion vectors, according to the value of the validity indicator assigned to the pixels to be created.

2. Process according to claim 1, characterized in that the pixels of the current frame (to+40 ms) are tagged as "normal", "occluding" or "uncovered" depending on the projection of the motion vector field of the preceding frame onto the current frame and in that the projected motion vectors of the preceding frame are those corresponding to the pixels tagged as "normal" and "occluding" of the current frame.

3. Process according to claim 1, characterized in that the generation of the pixels is forced by vertical filtering when they correspond to an uncovered zone, this zone being defined on the basis of the tagging of the current frame (to+40 ms) and of the true intermediate frame (to+20 ms).

4. A process according to claim 1, characterized in that, when the validity data assigned to a pixel, having led to its generation by vertical filtering, corresponds to an unreliable calculated motion vector, the spatial mode is selected for the adjacent pixels.

5. Process according to claim 1, characterized in that the determination of the validity data and the allocation of a motion vector to a pixel consists:

in assigning to each point of a grid of the intermediate pseudo-frame corresponding to the projection of the motion vectors, the grid definition being the accuracy obtained by the projections a validity data of different value depending on whether the point corresponds to the projection of a single motion vector or of several neighbor motion vectors, to no projection of motion vectors, to the projection of several non-neighbor motion vectors, the neighboring of vectors being defined by differences in their components below a certain specified threshold, in allocating to the points of the grid, in the case they correspond to a motion vector or several neighbor motion vectors, respectively this vector or the vector minimizing the displaced inter-image difference DFD (Displaced Frame Difference).

6. Process according to claim 5, characterized in that the validity data of a point of the grid is forced into the "non-neighbour vectors" setting depending on a test of similitude of the motion vectors allocated to the points of the grid lying in a block of specified size centred on the relevant point.

7. Process according to claim 5, characterized in that the determination of the validity data and of the motion vector allocated to a pixel to be constructed of the intermediate pseudo-frame (to+20 ms) takes into account the validity data assigned and the motion vectors allocated to the points of the grid belonging to a window centred about this pixel, the presence in this window of at least one data in the "non-neighbour vectors" setting generating an "unreliable vector calculation" data, the presence of several allocated vectors leading to the selection of the one minimizing the DFD.

8. Process according to claim 1, for the generation of a sequence of progressive images, characterized in that it consists in adjoining the intermediate pseudo-frame to the true intermediate frame, and in then performing a high-frequency filtering on the progressive complete image obtained.

9. Process according to claim 3, characterized in that when the validity data assigned to a pixel, having led to its generation by vertical filtering, corresponds to an unreliable calculated motion vector, the spatial mode is selected for the adjacent pixels.

10. Process according to claim 3, characterized in that when the validity data assigned to a pixel, having led to its generation by vertical filtering, corresponds to an unreliable calculated motion vector, the spatial mode is selected for the adjacent pixels.

11. Process according to claim 2, for the generation of a sequence of progressive images, characterized in that it consists in adjoining the intermediate pseudo-frame to the true intermediate frame, and in then performing a high frequency filtering on the progressive complete image obtained.

12. Process according to claim 3, for the generation of a sequence of progressive images, characterized in that it consists in adjoining the intermediate pseudo-frame to the true intermediate frame, and in then performing a high frequency filtering on the progressive complete image obtained.

13. Process according to claim 2, characterized in that the determination of a validity data and the allocation of a motion vector to a pixel consists:

in assigning to each point of a grid of the intermediate pseudo-frame corresponding to the projection of the motion vectors, the grid definition being the accuracy obtained by the projection, a validity data or different value depending on whether the point corresponds to the projection of a single motion vector or of several neighbor motion vectors, to no projection of motion vectors, to the projection of several non-neighboring motion vectors, the neighboring of vectors being defined by differences in their components below a certain specified threshold, in allocating to the points of the grid, in the case they correspond to a motion vector or several neighbor motion vectors, respectively this vector or the vector minimizing the displaced inter-image difference DFD (Displaced Frame Difference).

14. Process according to claim 3, characterized in that the determination of a validity data and the allocation of a motion vector to a pixel consists:

in assigning to each point of a grid of the intermediate pseudo-frame corresponding to the projection of the motion vectors, the grid definition being the accuracy obtained by the projection, a validity data of different value depending on whether the point corresponds to the projection of a single motion vector or of several neighbor motion vectors, to no projection of motion vectors, to the projection of several non-neighboring motion vectors, the neighboring of vectors being defined by differences in their components below a certain specified threshold, in allocating to the points of the grid, in the case they correspond to a motion vector or several neighbor motion vectors, respectively this vector or the vector minimizing the displaced inter-image difference DFD (Displaced Frame Difference).

15. Process according to claim 4, characterized in that the determination of a validity data and the allocation of a motion vector to a pixel consists:

in assigning to each point of a grid of the intermediate pseudo-frame corresponding to the projection of the motion vectors, the grid definition being the accuracy obtained by the projection, a validity data of different value depending on whether the point corresponds to the projection of a single motion vector or of several neighbor motion vectors, to no projection of motion vectors, to the projection of several non-neighboring motion vectors, the neighboring of vectors being defined by differences in their components below a certain specified threshold, in allocating to the points of the grid, in the case they correspond to a motion vector or several neighbor motion vectors, respectively this vector or the vector minimizing the displaced inter-image difference DFD (Displaced Frame Difference).

16. Process according to claim 4, for the generation of a sequence of progressive images, characterized in that it consists in adjoining the intermediate pseudo-frame to the true intermediate frame, and in then performing a high frequency filtering on the progressive complete image obtained.

17. Process according to claim 5, for the generation of a sequence of progressive images, characterized in that it consists in adjoining the intermediate pseudo-frame to the true intermediate frame, and in then performing a high frequency filtering on the progressive complete image obtained.

18. Process according to claim 6, for the generation of a sequence of progressive images, characterized in that it consists in adjoining the intermediate pseudo-frame to the true intermediate frame, and in then performing a high frequency filtering on the progressive complete image obtained.

19. Process according to claim 7, for the generation of a sequence of progressive images, characterized in that it consists in adjoining the intermediate pseudo-frame to the true intermediate frame, and in then performing a high frequency filtering on the progressive complete image obtained.

* * * * *